April 21, 1953      R. G. METZNER      2,636,154

VARIABLE-SPEED INDUCTION MOTOR

Filed May 5, 1950

INVENTOR.
ROBERT G. METZNER

BY Lyon & Lyon ATTORNEYS.

Patented Apr. 21, 1953

2,636,154

UNITED STATES PATENT OFFICE 2,636,154

VARIABLE-SPEED INDUCTION MOTOR

Robert G. Metzner, Los Angeles, Calif.

Application May 5, 1950, Serial No. 160,214

8 Claims. (Cl. 318—223)

My invention relates to induction motors and, more specifically, to one in which the speed can be controlled.

The speed at which an induction motor runs under load is governed by the number of cycles per second of the alternating current energizing the motor and the number of poles in the induction motor; the more poles the slower the motor turns.

The ordinary induction motor turns at a speed which is somewhat below the theoretical or synchronous speed that would result from a given number of pairs of poles and an alternating current of given frequency.

My invention comprises a manner in which the speed of the induction motor can be varied without changing any of the construction of an ordinary induction motor. By varying the energization of the windings of the motor I am able to construct a variable speed induction motor.

Generically my invention comprises varying the connection of the coils of the energizing winding of an induction motor, for example, a 4-pole induction motor having salient poles with coils on two of the salient poles only, so that the effect is that of gradually changing from a four pole to a six pole induction motor.

Other objects and advantages of my invention will be apparent from the following description of the preferred embodiments thereof.

Figure 1:
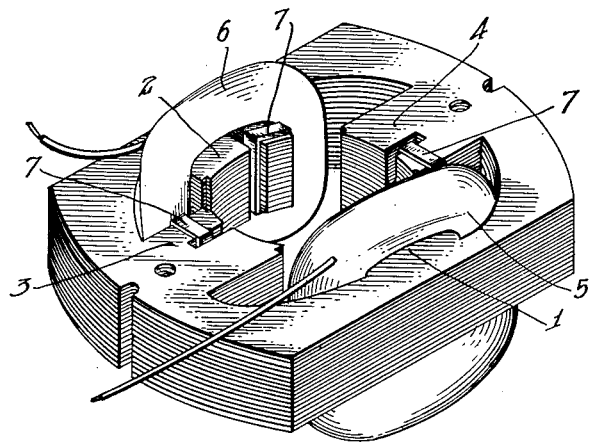
Figure 1 is perspective view of a standard 4-pole squirrel cage induction motor with the squirrel cage, rotor and bearings removed to show the poles.

The manner in which my invention functions is as follows:

In Figure 1 is shown a 4-pole 2-coil squirrel cage induction motor of the type regularly manufactured. In Figure 1, for purposes of clarity, I have left out the ordinary squirrel cage rotor and bearings which are well known in the art.

This motor has four salient poles, 1, 2, 3 and 4. The poles 1 and 2 have energizing coils 5 and 6 wound thereon. A portion of each of the poles is surrounded by a copper shading coil 7 which serves to delay the magnetic flux in that portion of the pole to provide starting torque. The coils 5 and 6 are wound upon the poles 1 and 2 in the ordinary manner and when these two coils 5 and 6 are connected in series, as later described, the two poles 1 and 2 have a like polarity. Under this condition the other two poles 3 and 4 assume a polarity opposite to that of the poles 1 and 2. Under these conditions the motor operates as a four pole motor and a rotating field results having a synchronous speed of 1800 R. P. M. when a 60 cycle A. C. current is connected to the motor circuit. The actual speed of the rotor is below the synchronous speed by the amount of slip caused by the load on the motor. This condition is that of a standard squirrel cage rotor induction motor having two consequent poles. If the coils 1 and 2 are connected in such a way that they produced flux of opposite polarity in the poles which they surround, it is found that the motor operates as if it were a 6-pole motor. This motor then runs at a speed somewhat below a synchronous speed of 1200 R. P. M.

My invention provides a means not only of reversing the polarity of one of the poles having a coil 5 or 6 thereon with relation to the other similar pole but in addition provides a gradual means of reversing said polarity, thereby establishing a means of variable speed control.

Figure 2:
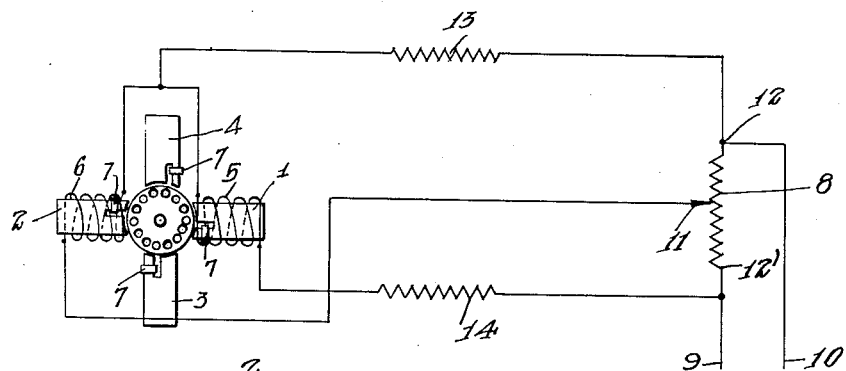
Figure 2 is a schematic wiring diagram.
Figure 3:
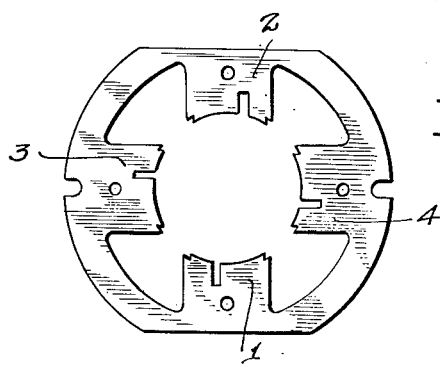
Figure 3 is a plan view of the electromagnetic core of a 4-pole squirrel cage induction motor.

Referring to Figure 2, a variable potentiometer 8 has its end terminals 12' and 12 connected to the alternating current lines 9 and 10, respectively. One terminal of the coil 5 is connected to the line 9 and one terminal of the coil 6 is connected to the variable contact 11 of the potentiometer through a resistor 14. The other terminals of the coils 5 and 6 are connected together and to the other line 10 through a resistor 13. When the potentiometer 8 has its variable contact 11 moved to the end 12, the coils 5 and 6 are in series across the alternating current lines 9 and 10. The resistor 13, the purpose of which I will disclose hereinafter, is in parallel with coil 6 under this condition of operation. This reduces the current in coil 6 with respect to the current in the coil 5, since all of the current through the resistor 13 and the coil 6 flows through the coil 5 under these conditions the resistor 14 is then in series with the coils 5 and 6 and acts to limit the current in both coils.

When the contact 11 is at the end 12 of the potentiometer 8 the motor will operate at its fastest condition. The motor then operates as a 4-pole motor, the motor running at a speed somewhat less than 1800 R. P. M. If the potentiometer 8 has its contact set at the end 12', coils 5 and 6 are then in parallel and resistor 13 serves to reduce the voltage applied across the two coils sufficiently to make the current in each coil approximately equal to the current which flowed through the two coils when they were in series. However, due to the fact that the flow of current in coil 5 has been reversed with relation to the flow of current in coil 6, the motor now operates as if it were a 6-pole motor and the motor rotates at a speed somewhat less than 1200 R. P. M. That is to say, the speed is reduced to approximately two-thirds of its value when the contact 11 is at the extreme end 12 of the potentiometer, and the motor runs as if it had a number of poles equal to 3/2 times the number of salient poles on the stator. The speed varies gradually as the contact 11 of the potentiometer 8 is moved from the end 12' to the end 12.

It should be noted that in the parallel condition resistor 14 reduces the current in coil 5 with relation to coil 6, however, under the parallel condition the slight unbalance caused by the resistor 14 has negligible effect.

As an example of an ordinary standard squirrel cage induction motor of the type ordinarily employed in phonographs and running on 120 v., 60 cyc. A. C. current, I have found that the potentiometer 8 should have a resistance of 5000 ohms and be able to dissipate 50 watts. The resistor 13 should have a resistance of 125 ohms and be able to dissipate 25 watts and the resistor 14 should have a resistance of 40 ohms and be able to dissipate 10 watts. The resistances of the potentiometer and the two resistors will, of course, vary according to the particular size of the motor and the power to be delivered from said motor.

While I have described the preferred embodiments of my invention, I am not limited to the details of construction herein set forth except as presented in the following claims.

I claim:

1. An induction motor having relatively rotatable rotor and stator members, said stator having four salient poles each provided with a short circuited shading coil surrounding a portion only thereof energizing windings comprising an energizing coil wound upon each of two opposed salient poles only, an energizing circuit connected to said coils and having terminals for connecting said circuit to a source of alternating current power to energize said energizing coils to produce flux of like polarity in said two opposed salient poles, whereby the other salient poles become consequent poles and the speed of said rotor is that of an induction motor having four poles, said energizing circuit including control means for gradually reversing the energization of one of said energizing coils, whereby the speed of said rotor is gradually changed to that of an induction motor having six poles, said control means including a potentiometer connected across said terminals and having an adjustable contact connected to one end of one of said energizing coils, the other end of the other of said energizing coils being connected to one of said terminals and the other ends of both of said coils being connected to the other of said terminals through a common resistor.

2. An induction motor having relatively rotatable rotor and stator members, one of said members having an even number of pairs of salient poles, energizing windings comprising coils wound upon alternate ones only of said salient poles, each of said coils having one terminal connected to a terminal of another of said coils to provide a common terminal for a pair of coils, an energizing circuit for said motor having a pair of power terminals for connection to a source of alternating current power, said circuit having a current limiting resistor connected between one of said power terminals and said common terminal, the other terminal of one coil of said pair of coils being connected to said other power terminal, a potentiometer having its ends connected between said power terminals and having an adjustable contact movable between its ends, the other terminal of the other coil of said pair of coils being connected to said adjustable contact, said coils being connected so that they energize the salient poles upon which they are wound to produce flux of the same polarity in all of the salient poles having coils thereon when said contact is at one end of said potentiometer and flux of opposite polarity in alternate ones of said salient poles having coils thereon when said contact is at the other end of said potentiometer and said power terminals are connected to said source, whereby movement of said contact from said one end of said potentiometer to said other end thereof gradually reduces the speed of the rotor of said motor from that of an induction motor having a number of poles equal to that of the number of said salient poles to that of an induction motor having a number of poles equal to 3/2 times the number of said salient poles.

3. A motor in accordance with claim 2 in which said salient poles have short-circuited shading poles surrounding a portion only of said salient poles to provide starting torque.

4. A motor in accordance with claim 2 in which said coils are connected to energize the salient poles having coils thereon to produce flux of the same polarity in said salient poles having coils thereon when said contact is adjacent the end of said potentiometer connected to said current limiting resistor.

5. An induction motor having relatively rotatable rotor and stator members, one of said members having an even number of pairs of salient poles, energizing windings comprising an energizing coil wound upon each of alternate ones only of said salient poles, an energizing circuit for said motor for connecting said coils to a source of alternating current power to energize said coils to produce flux of like polarity in said salient poles having said coils wound thereon, whereby the other salient poles become consequent poles and the speed of said rotor is that of an induction motor having a number of poles equal to the number of said salient poles, said energizing circuit including control means for gradually reversing the energization of alternate ones of said coils to produce flux of opposite polarity in alternate poles having said coils wound thereon, whereby the speed of said motor is gradually changed to that of an induction motor having a number of poles equal to three halves the number of said salient poles, said control means being a potentiometer connected across said source when said energizing circuit is connected to said source, one terminal of said alternate ones of said coils being connected to an adjustable contact of said potentiometer.

6. An induction motor having relatively rotatable rotor and stator members, one of said members having an even number of pairs of salient poles, energizing windings comprising an energizing coil wound upon each of alternate ones only of said salient poles, an energizing circuit for said motor for connecting said coils to a source of alternating current power to energize said coils to produce flux of like polarity in said salient poles having said coils wound thereon, whereby the other salient poles become consequent poles and the speed of said rotor is that of an induction motor having a number of poles equal to the number of said salient poles, said energizing circuit including control means for gradually reversing the energization of alternate ones of said coils to produce flux of opposite polarity in alternate poles having said coils wound thereon, whereby the speed of said motor is gradually changed to that of an induction motor having a number of poles equal to three halves the number of said salient poles, said control means being an impedance connected across said source when said energizing circuit is connected to said source, said impedance having a contact adjustable between its ends, one terminal of said alternate ones of said coils being connected to the adjustable contact of said impedance.

7. An induction motor having relatively rotatable rotor and stator members, said stator having an even number of pairs of salient poles, energizing windings having an energizing coil wound upon each of alternate ones only of said salient poles, an energizing circuit for connecting said coils to a source of alternating current power including control means having a control element movable between two end positions, said circuit being connected to energizing said coils to produce flux in the same direction in all of the salient poles having said coils wound thereon when said control element is in one end position and to gradually decrease, reverse and then gradually increase in the opposite direction the energization of alternate ones of said coils when said movable element is gradually moved from said one end position to its other end position, whereby gradual movement of said members from said one end position to said other end position gradually reduces the speed of the rotor of said motor from that of an induction motor for a number of poles to that of the number of said salient poles to that of an induction motor having a number of poles equal to three halves times the number of said salient poles.

8. An induction motor having a rotor and a stator provided with four salient poles each having a short-circuited shading coil surrounding a portion only of each of said salient poles to provide starting torque, an energizing coil wound on each of two opposed salient poles only, an energizing circuit having terminals for connection to a source of single-phase alternating current power, said circuit connecting one of said energizing coils between said terminals for energization in one direction when said terminals are connected to said source, an impedance connected between said terminals and having a contact movable between its ends, the other of said energizing coils having one of its ends connected to said movable contact and the other of its ends to a point in said circuit having a voltage midway between the voltages of said terminals, whereby said other coil is energized in said one direction when said contact is at one end of said impedance and gradual movement of said contact from said one end of said impedance to the other gradually decreases, reverses and then gradually increases in the opposite direction the energization of said other coil to gradually reduce the speed of the rotor of said motor from that of a four-pole induction motor to that of a six-pole induction motor.

ROBERT G. METZNER.

References Cited in the file of this patent

UNITED STATES PATENTS

| Number | Name | Date |
|---|---|---|
| 2,019,323 | Stark | Oct. 29, 1935 |
| 2,341,482 | Stephan | Feb. 8, 1944 |

FOREIGN PATENTS

| Number | Country | Date |
|---|---|---|
| 635,462 | Germany | Sept. 17, 1936 |